Feb. 24, 1925.  1,527,242
M. WEIL
PHONOGRAPH MOTOR AND THE LIKE AND METHOD FOR LUBRICATING THE SAME
Filed Aug. 21, 1920   2 Sheets-Sheet 1

Inventor
Maximilian Weil
By his Attorney
George C. Dean

Feb. 24, 1925. 1,527,242
M. WEIL
PHONOGRAPH MOTOR AND THE LIKE AND METHOD FOR LUBRICATING THE SAME
Filed Aug. 21, 1920 2 Sheets-Sheet 2
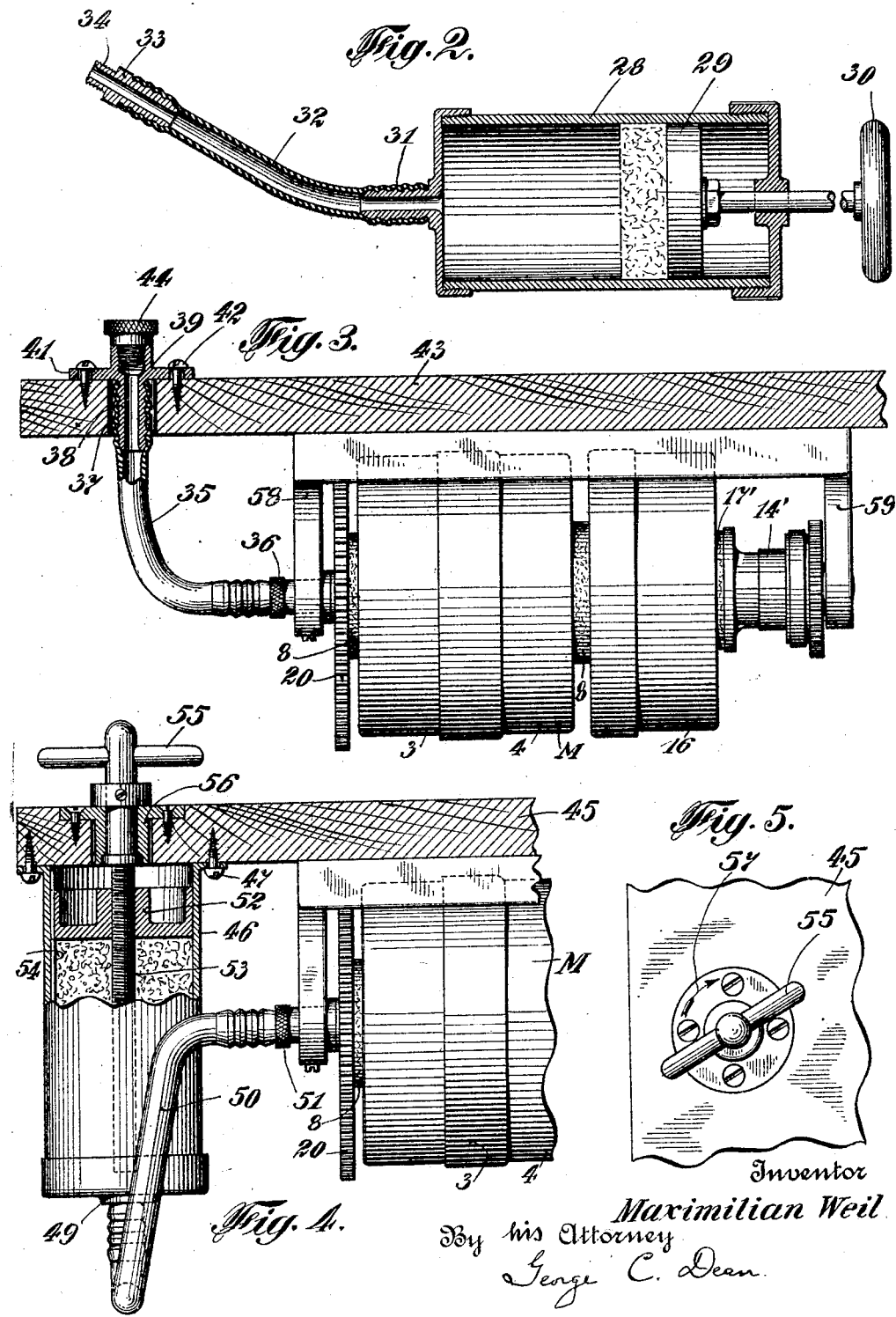
Inventor
Maximilian Weil
By his Attorney
George C. Dean Patented Feb. 24, 1925.

1,527,242

UNITED STATES PATENT OFFICE.

MAXIMILIAN WEIL, OF NEW YORK, N. Y.

PHONOGRAPH MOTOR AND THE LIKE AND METHOD FOR LUBRICATING THE SAME.

Application filed August 21, 1920. Serial No. 405,035.

*To all whom it may concern:*

Be it known that I, MAXIMILIAN WEIL, a citizen of the United States, and resident of New York, in the county of New York and State of New York, have invented certain new and useful Improvements in Phonograph Motors and the like and Methods for Lubricating the Same, of which the following is a specification.

My present invention relates primarily to lubrication and is particularly concerned with the lubrication of spring motors of the general type employed for phonographs.

An object of the invention is to provide a method for eliminating the difficulties heretofore encountered, both in the original lubrication of motors of the above type and in the relubrication thereof after installation and use. Another object is to provide a motor construction to which this method of lubrication is readily applicable.

It has been the practice in assembling phonograph spring motors of the type commonly employed to insert the springs in the corresponding drum segments, to ladle as much lubricating grease as possible into the drum segments and then to assemble the latter to constitute the complete motor. This operation is not only slow and unclean, but it does not ordinarily permit the complete filling of all space within the drum structure, about and between the convolutions of the driving spring structure, so that parts of the driving spring structure may remain unlubricated, with consequent noise in operation and likelihood of spring breakage at such parts. Similar difficulties occur in relubrication after use, in that the motor is first taken apart and reassembled after lubricant has been placed in the drum segments in the manner already set forth.

A feature of my invention consists in a novel method for producing a lubricated spring motor according to which the motor is first assembled completely and then lubricant is admitted into the liquid-tight enclosing casing thereof, through an aperture therein, the lubricant being preferably forced in in such quantity as to completely fill all of the interstices between the convolutions of the spring and between the spring and the casing, the aperture being then closed or blocked, to prevent egress of lubricant.

The method is broadly applicable to any spring motor provided with an enclosing casing to hold lubricant therein for submerging the convolutions of the encased spring structure, and in its broadest aspects the method may be carried out by providing an aperture in any part of the motor casing through which the lubricant is forced after assembly.

Preferably, however, my method is applied to the conventional or standard construction of phonograph motor in common use, the various parts of the power plant being used in the identical form in which they are commonly manufactured. In this application one of the casing parts is provided with an opening accessible in the assembled motor to permit admission of the lubricant to the interior, the closure for the opening being so arranged as not to interfere with the rotation of the drum in normal operation. In a preferred embodiment the drum and the enclosed spring or springs are of conventional construction in every respect and the supporting rod which carries the spring motor is made tubular in form, permanently closed at one end and provided with a displaceable or removable cover at the other, there being one or more lateral openings in the tubular rod communicating with the interior of the casing to allow entry of lubricant thereto, fed from the exterior.

According to another feature of the invention a duct, preferably in the form of a flexible tube, is permanently connected to the aperture for admitting lubricant to the casing from some accessible part of the phonograph so that lubrication of the motor can be effected by the ordinary user without need for touching or even inspecting the motor.

In the accompanying drawings in which are shown one or more of various possible embodiments of the several features of this invention, Figure 1 is a view in longitudinal section of the power plant of a spring motor embodying my invention;

Figure 2 is a view in longitudinal section of a preferred form of grease gun for use in the execution of my method;

Figure 3 is a side view, partly in section, showing one manner of installation of the motor;

Figure 4 is a view similar to Figure 3, showing another manner of installation, and Figure 5 is a top view of Figure 4.

Figure 1:
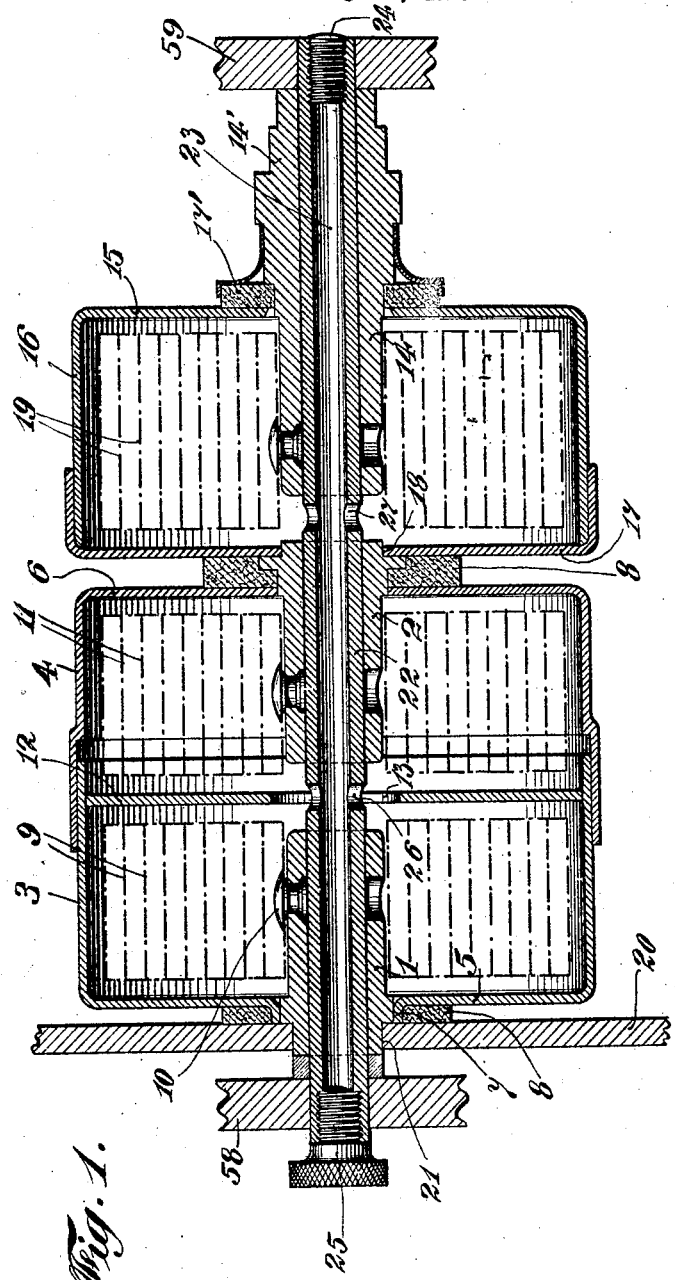

Referring now to the drawings I have illustratively shown in Figure 1 a phonograph motor of the three-spring type comprising a pair of aligned bushings 1 and 2 having concentric therewith a pair of drum segments 3 and 4 provided respectively with integral end walls 5 and 6 which encircle the bushings as at 7, stuffers 8 being provided to form liquid-tight connections at the junction between the drum segments and the bushings. A spring 9 is coiled about bushing 1 and anchored thereto by a rivet as at 10, the other end of the spring being anchored to the interior of the drum by a similar anchor, not shown. A spring 11 is similarly coiled about bushing 2, being anchored thereto at one end and to drum element 4 at the other. The two springs 9 and 11 are thus connected in series by means of the drum 3—4, which is floatingly mounted upon the two bushings 1 and 2, the torque being transmitted by means of these springs from the bushing 1 to the bushing 2. A separating disk 12 is secured within the drum and has a central opening 13 preferably larger in diameter than that of the bushings, this plate serving to prevent interference between the two springs.

A third bushing 14 is arranged in alignment with bushings 1 and 2 and has floatingly mounted thereon the end wall 15 of a drum 16, the opposite end wall 17 of said drum being connected as at 18 for rotation as a unit with the bushing 2. A spring 19 is coiled about bushing 14 and secured thereto at one end and to the drum 16 at the other, this spring thus being connected in series with springs 9 and 11. A stuffer 17' encircles the bushing 14 and serves to render liquid-tight the connection between the said bushing and the adjacent drum. The bushing 14 is extended beyond drum 16 as at 14' for application of the winding torque by a construction not part of my present invention, and therefore not shown. At the end of the spring motor opposite the winding gear is provided a gear 20 shown in fragmentary form and encircling the projecting end 21 of the bushing 1 and rigid therewith, the said gear serving to transmit the torque from the spring motor to the mechanism to be driven (not shown).

The mechanism thus far described is the strictly conventional three-spring phonograph motor drum in common use. In common practice this motor is mounted in place between supports as at 58 and 59 in the motor frame by means of a solid rod extending through the three bushings 1, 2 and 14, and through the supports 58 and 59, the bushings floating upon said rod.

According to the preferred form of my invention, I provide a supporting rod 22 of the same external diameter as the rod in common use, this rod being preferably tubular in form having a longitudinally extending opening or bore 23. This tubular rod may be made of tubing of a standard gauge. A plug 24 is preferably permanently secured within the tubular rod at the winding end and a removable plug or other closure 25 closes the rod at the power delivery end of the drum.

Between adjoining ends of the bushings 1 and 2 and preferably symmetrically with respect to the separating plate 12 I provide one or more lateral passages or openings 26 in the wall of the tubular supporting rod.

Two such openings may be provided in alignment with each other, as shown in the drawing, the operation of drilling the openings so arranged being particularly easy. If desired, however, the openings may be provided one between the separating plate 12 and bushing 1 and the other between said plate and bushing 2. Obviously, a greater number of such openings might be employed, or if desired, but a single opening. Between adjoining ends of bushings 2 and 14 I preferably provide lateral openings or passages 27 identical with the openings 26 just described.

For assembling the motor in the factory and lubricating the same preparatory to installation upon a phonograph, the drum is completely assembled without lubricant in the manner shown in Figure 1, and the supporting rod 22 is passed through the bushings and lodged in the supports 58 and 59 of the motor frame. The plug 25 may be omitted in the original assembly or removed after assembly, whereupon the lubricating grease is forced by any appropriate means through the open end of the tubular supporting rod 22. The lubricant passes along the length of the rod and travels through openings 26 and 27 into the interior of the drums 3—4 and 16 and between the convolutions of the springs contained therein. By preference the lubricant is forced in under substantial pressure to compel the filling of all of the space within the drums not occupied by the springs.

For the purpose of feeding the lubricant to the drum I prefer to employ a grease gun substantially of the form shown in Figure 2. This gun comprises preferably a cylinder 28 having therein a piston 29 operated by a handle 30, the cylinder having a delivery end 31 connected by a flexible tube 32 preferably made of a composite fabric of cotton and rubber, said tube having a nozzle piece 33 provided at its end, as as 34, with a thread of the same diameter and pitch as that of plug 25. The grease gun has preferably a capacity equal to or slightly greater than necessary to completely fill the spring motor drum structure with lubricant. The grease gun being first filled with lubricant, the nozzle 34 is screwed into the open end of the supporting rod or tube 22 and the handle 30 is forced inwardly. The lubricant will travel through the bore 23 of the tubular rod and will emerge through openings 26, separating at the inner periphery of plate 12 so that it is distributed substantially equally at opposite sides of the plate 12. The lubricant enters laterally between the convolutions of the springs 9 and 11, reaching the spaces between the convolutions thereof successively until the space between the outermost convolutions is filled, whereupon the admission of more lubricant will cause the space between the springs and the drum to be completely filled. It will be understood that simultaneously with the admission of lubricant to drum 4 some lubricant will be admitted through openings 27 which are in parallel with openings 26. As openings 26 are closer to the source of pressure than springs 27, it will of course be apparent that the lubricant will first enter drum 3—4 at a considerably faster rate than it does drum 16. As the drum 3—4 becomes filled, however, and the resistance to further admission of lubricant thereto increases, the remaining lubricant in the grease gun will be effectively forced through openings 27 to also completely fill drum 16. In this operation the air within the drum structure will be forced out at the junction between the drums and the bushings, the connection at these points being, however, liquid-tight to prevent egress of the relatively thick lubricant.

The detailed operation just set forth with regard to the passage of lubricant to the interior of the spring motor, although specifically described in connection with the use of the grease gun shown in Figure 2, of course also takes place regardless of what method or apparatus is employed for feeding or forcing the lubricant through the tubular supporting rod.

It will be seen that the combination of the drums 3—4 and 16, the bushings 1, 2 and 14, and the tubular supporting rod 22 with its plugs 24 and 25 at opposite ends constitutes a liquid-tight casing. The hollow rod 22 is a stationary part of the casing, and the drum structure 3, 4, 16 is a casing part rotating slowly in operation about the rod, the stuffers 8, 8, and 17′, preventing escape of lubricant at the points of contact between the stationary rod and the moving drum.

In the preferred construction as set forth, the lubricant is admitted through the supporting rod or stationary casing part. It is apparent, however, that the lubricant may be admitted, if desired, through an aperture in the drum structure or movable part of the power plant, provided the closure is so constructed and arranged as not to interfere with the spring structure on the interior, or with adjacent parts of the motor frame or transmission (not shown) on the exterior.

As the lubricant in the construction set forth is first forced between the innermost convolutions of the spring and then in succession between the convolutions at greater distances from the center, any stresses upon the springs in this process, are symmetrically applied and there is no distorting force tending to press together convolutions at one or more points, such objectionable action preventing the entry of lubricant at such points.

Although I prefer to employ the specific construction shown in which the lubricant is admitted through a passage through the supporting rod, the said supporting rod being preferably in the form of a tube, it will be understood that my invention in its broadest aspects could be carried out by providing one or more apertures at any other part or parts of the liquid-tight casing above referred to.

It will thus be seen that by the procedure set forth, the spring motor can be completely packed with lubricant at considerable speed and in a thoroughly cleanly manner, the need for ladling the lubricating grease between the convolutions of exposed springs prior to complete assembly of the motor being entirely eliminated.

It will be apparent, of course, that the invention is equally applicable to spring motors having less than three or more than three springs. In the case of a two-spring motor, the drum 16 and bushing 14 of Figure 1 are eliminated, together with the passage 27 in the supporting rod leading to said drum, the winding torque being applied to bushing 26 which is preferably elongated in the manner of bushing 14.

For relubricating the motor after installation and use in the phonograph, the operation above described might be executed, with the grease gun of Figure 2, without removing the motor from the phonograph, and this may be accomplished either by a service agent or by the user of the phonograph.

Preferably, however, the motor is so installed upon the phonograph that relubrication can be effected without direct access or even inspection of the motor itself. One manner of accomplishing this result is indicated in Figure 3, in which the general outline of the motor M is shown, it being understood that this motor may be identical in construction with that shown in Figure 1. A flexible tube 35 is connected at one end 36 for communication with the bore 23 of the supporting rod, the opposite end 37 of the tube having a liquid-tight connection with a nozzle 38 formed integral with a fitting 39, said fitting having a flange 41 secured by screws 42 preferably to the top of the motor board 43 upon which the motor M is mounted. A removable plug 44 preferably closes the opening in fitting 39. For lubrication the plug 44 is removed, the threaded nozzle 34 of the grease gun shown in Figure 2 is substituted therefor and lubricant is forced therethrough by operation of the piston 29, the grease traveling through the tube 35 and into the tubular supporting rod 22 whence it enters the drums and between the convolutions of the spring in the manner heretofore set forth.

A further illustrative arrangement for lubricating or relubricating the spring motor from the exterior of the phonograph, is shown in Figure 4. This figure shows the motor M, which may be identical with that of Figure 1, secured to a motor board 45. A grease cup 46 is preferably secured by screws 47 to the lower surface of motor board 45 and has a quantity of lubricant therein. The delivery end 49 of the grease cup is connected preferably by a flexible tube 50 to the tubular supporting rod 22 at the power delivery end of the motor by any desired means, as at 51. The specific construction of the grease cup is not material to this invention and it may be briefly noted that it preferably comprises a piston 52 threaded about a threaded rod 53 extending the length of the cylinder, the said piston having a keyed connection to the cylinder as at 54 to prevent relative rotation. An operating turnbutton 55 extends from the rod above the upper surface of motor board 45 and through a bushing 56 in said motor board. Below the handle 55 there is provided an arrow 57 indicating the direction in which the turn button 55 should be turned to effect lubrication. If desired, an appropriate legend (not shown) may indicate the purpose of the button 55. By the use of the apparatus shown in Figures 4 and 5 it will be seen that an auxiliary supply of lubricant is available in a concealed position within the phonograph and whenever further lubrication is desired the operator need merely turn the button 55 through an appropriate angle and the lubrication takes place expeditiously and without dirt or annoyance.

Although the entire drum structure rotates in operation, the connection of the flexible tube 35 in Figure 3 and 50 in Figures 4 and 5 remains stationary, since this connection is at a stationary part of the casing, at the supporting rod 22.

Although according to the preferred execution of my invention, the spring motors will be filled with lubricant before shipment from the factory, it will be apparent that the motors might be shipped unlubricated and any of the arrangements of apparatus above described or other forms of apparatus may be utilized for filling the motor with lubricant after installation thereof in the phonograph, in accordance with the method set forth.

Obviously the invention is not confined in its application to spring motors for phonographs but might be utilized to good effect for spring motors of a great variety of constructions and for a great variety of uses. In its broader aspects the invention is applicable to different forms of operating mechanisms, whether spring propelled or not.

It will be apparent that my invention might be applied to advantage in combination with the mechanism shown in my co-pending application, Serial No. 396,211, filed July 14, 1920, in which event the clutch element in said co-pending application would preferably have radial passages for communication with the openings 26 in the tubular supporting rod.

I claim:

1. A spring motor, comprising in combination, a substantially grease-tight enclosure including as part thereof a drum having end walls, and a coil spring confined within said drum casing, said enclosure including a substantially liquid-tight closure for a passage through which lubricant may be admitted to the interior of the drum.

2. A spring motor, comprising in combination, a drum having end walls, and an axial supporting rod therefor coacting therewith to provide a grease-tight enclosure, a coil spring about said rod and within said drum, said drum including a substantially liquid-tight closure at one end thereof for an aperture through which lubricant may be admitted to the interior thereof to fill the spaces therein about the spring and between the convolutions thereof.

3. A spring motor comprising in combination, a grease-tight enclosure including a drum having end walls, a bushing extending into said drum, and a spring coiled about said bushing and secured thereto at one end and to said drum at the other, said enclosure including a substantially liquid-tight closure at one end thereof for an aperture extending longitudinally through said bushing for the purpose of admitting lubricant to the interior of the enclosure to fill the spaces therein about the spring and between the convolutions thereof.

4. A spring motor comprising, in combination, a drum having end walls, an axial supporting rod therefor, a bushing floatingly mounted upon said rod and extending into said drum, said rod coacting with said bushing to provide a grease-tight casing, and a spring coiled about said bushing and secured thereto at one end and to said drum at the other, said casing including a substantially liquid-tight closure at one end thereof for an aperture extending longitudinally through said bushing for the purpose of admitting lubricant to the interior of the casing, to fill the spaces within the casing about the spring and between the convolutions thereof.

5. A spring motor comprising, in combination, a grease-tight enclosure, said enclosure having a stationary part, a part moving with respect thereto in operation, and means establishing a liquid-tight connection between the stationary and the moving parts, said enclosure including a substantially liquid-tight closure for a passage through which lubricant may be admitted to the interior, said closure being constructed and disposed in such manner as to clear the motor structure within the moving enclosure part, and also the structure exterior of said part.

6. A spring motor comprising in combination, a grease-tight enclosure comprising a rotating drum structure, a stationary part extending axially thereof, means establishing a liquid-tight connection between the stationary and the moving parts, and a substantially liquid-tight closure in said stationary casing part for a passage through which lubricant may be admitted to the interior of said enclosure.

7. A spring motor comprising in combination, a drum having end walls and an axial supporting rod therefor extending beyond said drum at one end and coacting therewith to provide a grease-tight enclosure, a coil spring about said rod and within said drum, said supporting rod having a duct extending from the projecting end thereof to the interior of said enclosure through which lubricant may be admitted, and a liquid-tight closure for said duct.

8. A spring motor having a winding end and a power delivery end, comprising in combination, a drum having end walls and an axial supporting rod therefor coacting with said drum to provide a grease-tight enclosure, a coil spring about said rod and within said drum, said rod having a well extending axially thereof from the power delivery end and communicating with the interior of said enclosure to provide a path for the admission of lubricant, and a liquid-tight closure for said well.

9. A spring motor comprising in combination, an enclosing drum structure, an axial supporting rod therefor, tubular in form closed at one end and open at the other and having a lateral opening for communication between the interior of said rod and the interior of said drum structure, and a grease-tight closure for the open end of said tubular supporting rod.

10. A spring motor comprising, in combination, a drum having end walls, an axial supporting rod therefor, a bushing floatingly mounted upon said rod and extending into said drum, a spring coiled about said bushing and secured thereto at one end and to said drum at the other, said supporting rod having an axial well therein communicating with the interior of said drum to one side of said spring, and a removable closure for said well.

11. In a spring motor of the type including a supporting rod, a drum structure floatingly mounted on said rod and having a grease-tight connection therewith, and a pair of coil springs arranged in side-by-side relation within said structure and connected in series; the provision of a duct extending along the length of said rod and having communication with the interior of said drum adjacent both said springs, and a displaceable closure for the open end of said duct.

12. In a spring motor of the type including a supporting rod, a pair of bushings floatingly mounted thereon and spaced from each other, a drum having end walls encircling said bushings and having a grease-tight connection thereat, a pair of springs, one corresponding to each said bushing and secured thereto at the inner end, said springs being secured at the outer ends to said drum; the construction in which the supporting rod is tubular in form, closed at both ends and has a port located between adjoining ends of said bushings, the closure at one end of said rod being displaceable to permit entry of lubricant therethrough to the interior of said drum through said tubular supporting rod and said port.

13. In a spring motor of the type comprising a supporting rod, a pair of bushings floatingly disposed thereon and spaced from each other, a drum having end walls encircling said bushings and having a grease-tight connection therewith, a pair of coil springs, one corresponding to each said bushing and connected thereto at the inner end, said springs being connected to said drum at the outer end, and an annular separating plate extending between said springs; the construction in which the supporting rod is tubular in form, closed by plugs at both ends, one of said plugs being removable, and in which said rod has a port communicating with the interior of said drum at a point between said bushings, said port being substantially bi-sected by the plane of said separating plate.

14. In a spring motor of the type including a supporting rod, a pair of bushings floatingly mounted thereon, a drum having end walls encircling said bushings and having a grease-tight connection therewith, a pair of springs within said drum, one corresponding to each said bushing and secured thereto at one end and to said drum at the other, a third bushing encircling said rod and a drum having an end wall floatingly mounted upon said third bushing and a second end wall rigidly connected to the adjacent bushing, and a spring within said latter drum secured thereto at one end and to said third bushing at the other, said drums being constructed and arranged to form a liquid-tight enclosure; the construction in which said enclosure includes substantially liquid-tight closure means for passages through which lubricant may be admitted to the interior of the two drums.

15. In a spring motor of the type including a supporting rod, a pair of bushings floatingly mounted thereon, a drum having end walls encircling said bushings and having a grease-tight connection therewith, a pair of springs within said drum, one corresponding to each said bushing and secured thereto at one end and to said drum at the other, a third bushing encircling said rod and a drum having an end wall floatingly mounted upon said bushing and a second end wall rigidly connected to the adjacent bushing, a spring within said latter drum secured thereto at one end and to said third bushing at the other, said drums and said supporting rod coacting to form a liquid-tight enclosure; the construction in which a liquid-tight closure is provided at an end of one of said drums through which lubricant may be admitted to the interior of the enclosure, and in which a duct effects communication between the interior of the two drums.

16. In a spring motor of the type including a supporting rod, a pair of bushings floatingly mounted thereon, a drum having end walls encircling said bushings and having a grease-tight connection therewith, a pair of springs within said drum, one corresponding to each said bushing and secured thereto at one end and to said drum at the other, a third bushing encircling said rod and a drum having an end wall floatingly mounted upon said bushing and a second end wall rigidly connected to the adjacent bushing, a spring within said latter drum secured thereto at one end and to said third bushing at the other; the construction of said supporting rod of tubing closed at both ends, the closure at one end being removable, said tubing having an aperture disposed between adjacent ends of the first two bushings within the first drum and between the third bushing and that adjacent thereto within the second drum, whereby upon removal of said removable closure lubricant may be admitted into said tubular supporting rod and through the apertures into the two drums.

17. The combination of claim 16, in which the apertures in the rod are provided in diametrically opposite pairs and of equal diameter.

18. The combination in a phonograph, of a motor supported therein, said motor having a substantially grease-tight enclosure including a drum having end walls, a coil spring confined within said casing, a tube communicating at one end with the interior of said enclosure, and means upon an exposed part of said phonograph for directing the flow of lubricant to and through said tube to the interior of said enclosure.

19. A spring motor comprising in combination, a grease-tight enclosure comprising a rotating drum structure, a stationary part extending axially thereof, means establishing a liquid-tight connection between the stationary and the moving parts, a tube communicating at one end with a passage in said stationary casing part, and means upon an exposed part of said phonograph for directing the flow of lubricant to and through said tube to the interior of said enclosure.

20. A phonograph including in combination, a motor board, a spring motor secured thereto and including a horizontal drum having end walls, a coil spring confined within said drum, a tube communicating at one end with the interior of said drum, and means accessible from the exposed surface of said motor board for directing the flow of lubricant to and through said tube to the interior of said drum.

21. A phonograph comprising in combination, a motor board, a spring motor secured thereto and including a grease-tight enclosing drum containing lubricant, a tube communicating from the top of said motor board with the interior of said drum, and a closure for the exposed end of said tube, whereby when it is desired to lubricate the motor, the closure is opened and lubricant is fed by means of a grease gun or the like through the tube to enter the interior of the motor.

22. A phonograph comprising, in combination, a motor board, a motor secured thereto, said motor including a grease-tight casing and coil spring driving means enclosed therein, a grease cup secured to the lower surface of said motor board, a tube establishing communication between the delivery end of said grease cup and the interior of said motor casing, and an operating means for said grease cup accessible from the exposed side of the motor board.

23. A spring motor of the type employed in phonographs, comprising a grease-tight drum structure, a plurality of coil springs therein arranged side by side and connected in series, a duct within said structure arranged to convey lubricant to the springs in parallel, and a liquid-tight closure for closing said duct against egress of lubricant.

24. A spring motor of the type employed in phonographs, comprising a grease-tight drum structure, a plurality of coil springs therein, a duct within said structure arranged to convey lubricant to the springs in parallel, and a liquid-tight closure for closing said duct against egress of lubricant.

Signed at New York, in the county of New York and State of New York, this 19th day of August, A. D. 1920.

MAXIMILIAN WEIL.